(12) United States Patent
Zhao et al.

(10) Patent No.: US 10,294,409 B2
(45) Date of Patent: May 21, 2019

(54) MODIFIED GRAPHITE PARTICLE SYSTEM FOR STRENGTHENING POLYMER/BINARY/TERNARY COMPOSITE OIL DISPLACEMENT SYSTEM AND PREPARATION AND APPLICATION THEREOF

(71) Applicants: China University of Petroleum (East China), Qingdao (CN); Oil and Gas Technology Research Institute, PetroChina Changqing Oilfield Company, Xi'an (CN)

(72) Inventors: Guang Zhao, Qingdao (CN); Caili Dai, Qingdao (CN); Haien Yang, Qingdao (CN); Ping Yi, Qingdao (CN); Yuyang Li, Qingdao (CN); Jiaping Tao, Qingdao (CN); Yahui Lv, Qingdao (CN); Xue Yao, Qingdao (CN); Qing You, Qingdao (CN)

(73) Assignees: CHINA UNIVERSITY OF PETROLEUM (EAST CHINA), Qingdao (CN); OIL AND GAS TECHNOLOGY RESEARCH INSTITUTE, PETROCHINA CHANGQING OILFIELD COMPANY, Xi'an (CN)

(*) Notice: Subject to any disclaimer, the term of this patent is extended or adjusted under 35 U.S.C. 154(b) by 0 days.

(21) Appl. No.: 16/155,101

(22) Filed: Oct. 9, 2018

(65) Prior Publication Data
US 2019/0119558 A1    Apr. 25, 2019

(30) Foreign Application Priority Data

Oct. 19, 2017 (CN) .......................... 2017 1 0996586

(51) Int. Cl.
C09K 8/588 (2006.01)
E21B 43/16 (2006.01)
C09K 8/584 (2006.01)

(52) U.S. Cl.
CPC .............. *C09K 8/584* (2013.01); *C09K 8/588* (2013.01); *E21B 43/16* (2013.01)

(58) Field of Classification Search
None
See application file for complete search history.

(56) References Cited

U.S. PATENT DOCUMENTS

| 4,986,354 A * | 1/1991 | Cantu | C09K 8/516 166/279 |
| 2007/0289781 A1 * | 12/2007 | Rickman | C09K 8/68 175/65 |
| 2012/0067584 A1 * | 3/2012 | Zhang | C09K 8/64 166/308.1 |

FOREIGN PATENT DOCUMENTS

CN        107674664 A      2/2018

* cited by examiner

Primary Examiner — John J Figueroa
(74) Attorney, Agent, or Firm — Volpe and Koenig, P.C.

(57) ABSTRACT

The invention provides a modified graphite particle system for strengthening a polymer/binary/ternary composite oil displacement system. The modified graphite particle system comprises the following components: 1-5 parts by mass fraction dispersed graphite particles, 0.2-0.6 parts by mass fraction dispersant, 0.1-0.5 parts by mass fraction wettability modifier, and deionized water that accounts for the remaining content, based on 100 parts by total mass fraction of the components. In addition, the present invention also provides a preparation and a use of the modified graphite particle system for strengthening the polymer/binary/ternary composite oil displacement system. The modified graphite particle system for strengthening the polymer/binary/ternary composite oil displacement system can be used to improve mobility regulation ability and oil displacement efficiency in an injection stage, enhance injection pressure in a follow-up water displacement stage, and increase the oil displacement effect of the composite oil displacement system to the greatest extent.

5 Claims, 1 Drawing Sheet

MODIFIED GRAPHITE PARTICLE SYSTEM FOR STRENGTHENING POLYMER/BINARY/TERNARY COMPOSITE OIL DISPLACEMENT SYSTEM AND PREPARATION AND APPLICATION THEREOF

CROSS REFERENCE TO RELATED APPLICATIONS

The application claims priority to Chinese Application No. 201710996586.5, which was filed on Oct. 19, 2017, entitled "Modified Graphite Particle System for Strengthening Polymer/Binary/Ternary Composite Oil Displacement System and Preparation and Application Thereof", and is incorporated herein by reference as if fully set forth.

FIELD OF THE INVENTION

The present invention relates to the field of oil field chemistry, in particular to a modified graphite particle non-homogeneous composite displacement system for improving oil recovery efficiency, and preparation and use thereof.

BACKGROUND OF THE INVENTION

Water-flooding extraction is a main oil field exploitation method in China. However, long-term water-flooding extraction in oil fields results in aggravated non-homogeneity of the strata, accelerated water cut rising and degraded water flooding efficiency or inefficient circulation in the middle and late stages of oil field exploitation. Consequently, a great deal of oil remaining in the strata can't be recovered. Therefore, improving deep mining of the remaining oil is a key to increase and stabilize the yield in water-flooding extraction in oil fields in the middle and late stages. Improving the swept volume of oil displacement agents and improving the oil displacement efficiency of oil displacement agents are two approaches for water-cut control and production stabilization in oil fields at present. Chemical oil displacement techniques that mainly employ a polymer oil displacement system, polymer/surfactant binary composite oil displacement system, or polymer/surfactant/alkali ternary composite oil displacement system are important technical means for deep mining of the remaining oil, and have been successfully applied in field operations. The main functions of the polymer in a polymer oil displacement system or a composite oil displacement system established on the basis of a polymer are to increase the viscosity of the displacement fluid and alter the water-oil mobility ratio, so as to expand the swept volume and improve the oil recovery factor. Adding a surfactant into a polymer-based binary composite oil displacement system can decrease oil-water interfacial tension, modify wettability of rock surface, facilitate crude oil stripping from rock surface, improve oil displacement efficiency, and, in combination with the mobility modification ability of the polymer, greatly improve the oil recovery factor. For a polymer-based ternary composite oil displacement system, adding alkali can further enhance the oil displacement effect. The alkali added into the system can react with petroleum acids to produce surfactant and work with the added surfactant to improve the oil displacement efficiency of the composite oil displacement system. Furthermore, emulsified crude oil can be formed as a result of addition of the alkali, and thereby the viscosity of the displacement medium can be improved, and the mobility regulation and control ability of the polymer can be further improved. Field application results indicate that the oil recovery factor can be improved by more than 10% with polymer oil displacement techniques and polymer-based composite oil displacement techniques. However, some problems have occurred in field implementation of the above-mentioned techniques. For example, in a polymer oil displacement system or polymer-based composite oil displacement system, the viscosity of the polymer is severely decreased and the mobility control ability of the polymer is weakened under severe influences of the shearing action of the injection equipment and porous media in the strata and the physicochemical properties of the strata. Especially, in the follow-up water flooding stage, the injection pressure drops quickly, and the oil displacement agent may rush into the oil well easily. Consequently, the oil displacement effect of the oil displacement agent is severely limited, the service value of the oil displacement agent is decreased, and it is difficult to attain a long-time effective exploitation effect.

SUMMARY OF THE INVENTION

To improve the weak mobility control ability of the polymer in a polymer oil displacement system or composite oil displacement system in the prior art and increase the injection pressure in the follow-up water flooding stage, the present invention provides a modified graphite particle system, which can be dispersed in water-based fluids, is environment-friendly, stable in a long term, soft, and has self-lubrication ability, to strengthen mobility control ability of a polymer/binary/ternary composite oil displacement system, and thereby improve swept volume and oil displacement efficiency of oil displacement agents and attain a long-time effective water flooding effect.

The present invention provides a modified graphite particle system for strengthening a polymer/binary/ternary composite oil displacement system, and a preparation and a use thereof.

Utilizing the plugging property of the modified graphite particle system and the synergistic effect of cooperation with a polymer/binary/ternary composite oil displacement system, the present invention can improve mobility regulation ability and oil displacement efficiency in the injection stage, enhance injection pressure in the follow-up water displacement stage, and increase the oil displacement effect of the composite oil displacement system to the greatest extent.

To attain the objects described above, the present invention employs the following technical scheme:

A modified graphite particle system for strengthening a polymer/binary/ternary composite oil displacement system, comprising dispersed graphite particles, dispersant, and wettability modifier in the following:

Dispersed graphite particles: 1-5 parts by mass fraction;
Dispersant: 0.2-0.6 parts by mass fraction;
Wettability modifier: 0.1-0.5 parts by mass fraction;
Deionized water that amounts for the remaining content, wherein the sum of the components is 100 parts by the mass fraction.

Furthermore, in the modified graphite particle system provided in the present invention, the initial particle size of the dispersed graphite particles is 10 μm-150 μm.

Furthermore, in the modified graphite particle system provided in the present invention, the dispersant is a mixture of one or more compounds in a polyvinyl pyrrolidone series, with 8,00-32,000 mg/mol relative molecular weight. By adding polyvinyl pyrrolidone, the suspension stability of the dispersed graphite particles can be improved.

Furthermore, in the modified graphite particle system provided in the present invention, the wettability modifier is an alkylphenyl ethoxylate non-ionic surfactant represented by the following structural formula:

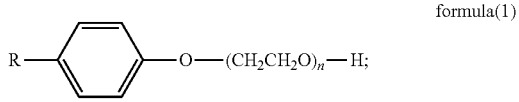

formula(1)

In the formula (1), R is $C_8$ alkyl; n is 9 or 10. By adding the wettability modifier, the wettability modification ability of the dispersed graphite particles can be improved, and the dispersibility of the modified dispersed graphite particles can be further enhanced.

The present invention further provides a method of preparing the above-mentioned modified graphite particle system for strengthening the polymer/binary/ternary composite oil displacement system, which comprises the following steps:

Adding graphite particles to be dispersed into deionized water and stirring for 10 min so that the graphite particles are dispersed at room temperature (20±5° C.); loading the dispersed graphite particles in an ultrasonic device, dispersing by ultrasonic dispersion for 1-5 h, holding in a still state for 1-4 h, and then taking the supernatant liquid; adding a dispersant into the supernatant liquid of dispersed graphite particles, dispersing by ultrasonic dispersion for 1-3 h, then adding a polyether non-ionic surfactant, and stirring for 1-6 h at 40-50° C. temperature. Thus, the modified graphite particle system for strengthening the polymer/binary/ternary composite oil displacement system in the present invention, which is well dispersed in 200 nm-100 μm size distribution, is obtained.

The present invention further provides a method of preparing the above-mentioned modified graphite particle system for strengthening the polymer/binary/ternary composite oil displacement system, which comprises the following steps:

Adding a polymer into solution preparation water, and stirring for 60-80 min so that the polymer is dissolved fully; adding a surfactant or alkali or adding the surfactant and the alkali in combination, and stirring for 5-10 min so that the surfactant and/or alkali are/is dissolved fully; finally, adding modified graphite particles and stirring for 5-10 min so that the graphite particles are dispersed fully. Thus, a modified graphite particle oil displacement system for strengthening a polymer/binary/ternary composite oil displacement system is obtained.

Specifically, the modified graphite particle system is the modified graphite particle system prepared with the above-mentioned method in the present invention in 150 nm-100 μm size distribution and 0.05-0.1 parts by mass fraction;

Specifically, the polymer is an anionic polymer with 14-18 million mg/mol molecular weight, at 20-30 percent hydrolysis degree, in 0.1-0.25 parts by mass fraction;

The surfactant for oil displacement described in the present invention is one of alkylbenzene sulfonate and petroleum sulfonate or a combination of them.

Specifically, the alkali is one of sodium carbonate, sodium bicarbonate and sodium hydroxide or a combination of them, in 0.4-0.6 parts by mass fraction;

Specifically, the solution preparation water is clean water or treated return water in an oil field.

Compared with the prior art, the present invention has the following advantages:

(1) The modified graphite particles for strengthening the polymer/binary/ternary composite oil displacement system in the present invention can be dispersed in water-based fluids, is soft and environment-friendly, has self-lubrication property and high stability, is highly compatible with polymers/surfactants/alkalis, and can enhance mobility control ability and oil displacement ability in a polymer/binary/ternary composite oil displacement process.

(2) The modified graphite particles for strengthening the polymer/binary/ternary composite oil displacement system can be prepared through a simple process, and are in nanometer or micrometer-level size distribution; an appropriate modified graphite particle system can be injected according to the conditions of the oil reservoir; the modified graphite particles are applicable to a variety of heterogeneous oil reservoirs; the dispersed graphite particles, dispersant, and wettability modifier required for preparation of the modified graphite particles are widely available and cheap.

(3) The modified graphite particles used in the present invention can attain a good synergistic effect with polymers/surfactants/alkalis, the resultant composite oil displacement system has high interfacial activity, the oil-water interfacial tension can be decreased to the order of $10^{-2}$ mN/m, and the oil displacement efficiency of the oil displacement agent can be improved significantly.

(4) The modified graphite particles used in the present invention are soft and have a self-lubrication property, can infiltrate into the deep portion of the formation and thereby improve regulation and control of the deep portion of the reservoir, and can improve the swept volume and oil displacement ability of the subsequently injected modified graphite particle oil displacement system for strengthening the polymer/binary/ternary composite oil displacement system to the greatest extent.

(5) By virtue of the direct plugging or bridge-plugging ability of the particles, the modified graphite particle system employed in the present invention can enhance the mobility control ability in the oil displacement process of the composite oil displacement system, and can keep the injection pressure at a high level in the follow-up injection process, and enhance the mobility control ability of the follow-up fluid.

(6) The modified graphite particle oil displacement system for strengthening the polymer/binary/ternary composite oil displacement system in the present invention can be prepared through a simple process and can facilitate large-scale field operation; in addition, with three oil displacement slugs, the oil displacement effect of the composite oil displacement system can be improved as far as possible.

BRIEF DESCRIPTION OF DRAWINGS

The above-mentioned and/or additional aspects and advantages of the present invention will become more apparent and more easily to understand in the description of embodiments with reference to the accompanying drawings. Among the drawings.

DETAILED DESCRIPTION OF THE EMBODIMENTS

Figure 1:
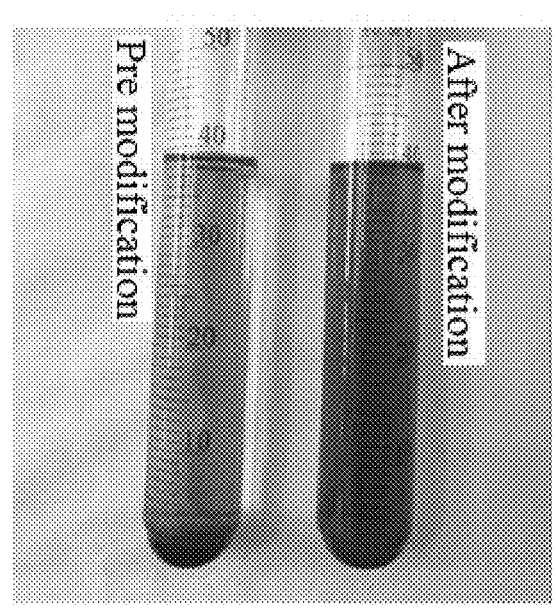
FIG. 1 shows the dispersion effect of the modified graphite particles for strengthening a polymer/binary/ternary composite oil displacement system in example 1 before and after modification
Figure 2:
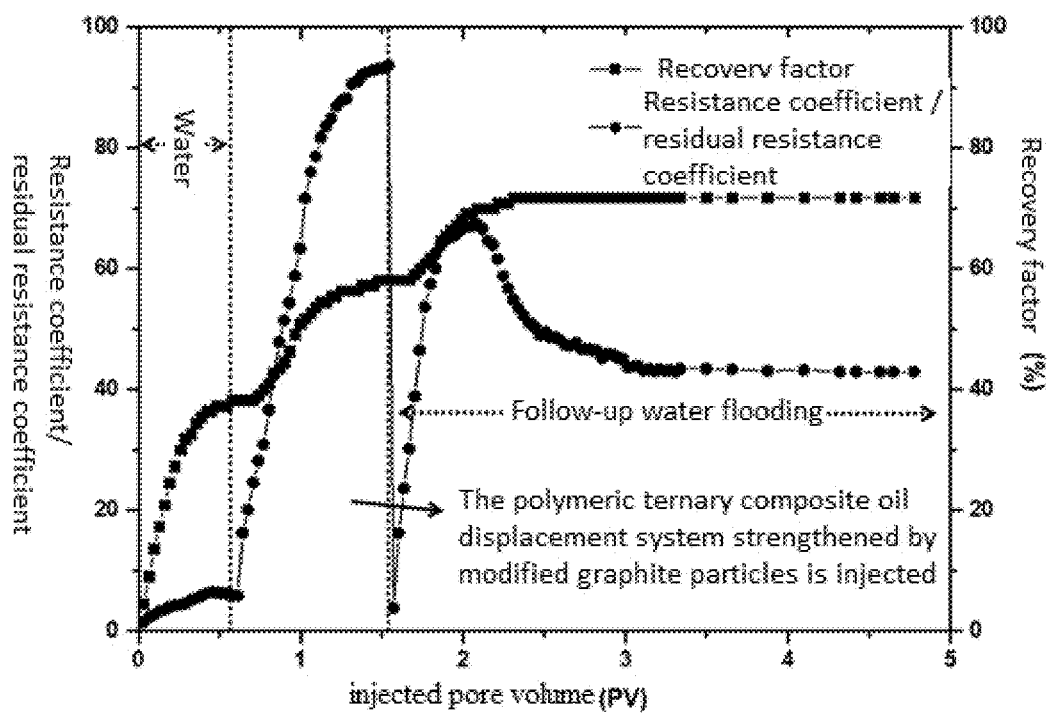
FIG. 2 shows the oil displacement effect of a polymeric ternary composite oil displacement system strengthened by modified graphite particles in example 3.

Hereunder some embodiments of the present invention will be detailed. The embodiments are illustrated in the accompanying drawings, wherein, identical or similar marks indicate identical or similar elements or elements with identical or similar functions. It should be noted that the embodiments described with reference to the accompanying drawings are only exemplary and are provided only to explain the present invention rather than constitute any limitation to the present invention.

To assist those skilled in the art to understand the present invention better, hereunder the present invention will be further detailed in Examples with reference to the accompanying drawings.

In the modified graphite particle system in the present invention, the dispersed graphite particle, dispersant, and wettability modifier are commercially available.

Example 1

A modified graphite particle system for strengthening a polymer/binary/ternary composite oil displacement system, comprising: dispersed graphite particles in 1.5 parts by mass fraction; dispersant in 0.5 parts by mass fraction; wettability modifier in 0.5 parts by mass fraction; and deionized water that amounts for the remaining content (97 parts by mass fraction); the sum of the components is 100 parts by mass fraction.

2 g graphite particles to be dispersed in 15 μm initial particle size is added into 98 g deionized water at room temperature (20±5° C.), and the mixture is stirred for 10 min so that the graphite particles are dispersed fully; the dispersed graphite particles are loaded into an ultrasonic device and dispersed by ultrasonic dispersion for 3 h, and then are held in a still state for 4 h; next, the supernatant liquid is taken; thus, 80 g dispersed graphite particle solution at 1.5 parts by concentration is obtained; 0.4 g dispersant is added into the 80 g dispersed graphite particle solution, and is dispersed by ultrasonic dispersion for 2 h; 0.4 g wettability modifier is added into the dispersed solution obtained in the above-mentioned steps, and the mixture is stirred at 40° C. for 6 h; thus, a modified graphite particle system for strengthening a polymer/binary/ternary composite oil displacement system in 200 nm particle size is obtained.

In this example, a use of the polymer oil displacement system strengthened by the modified graphite particles is further provided:

0.2 g anionic polymer is added into 99.7 g clean water at room temperature (20±5° C.) while the mixture is stirred, and then the mixture is further stirred for 60 min so that the anionic polymer is dissolved fully; next, 0.1 g modified graphite particles are added, and the mixture is stirred for 10 min so that the modified graphite particles are dispersed fully; thus, a polymer oil displacement system strengthened by modified graphite particles is obtained, wherein the polymer in the composite oil displacement system is 0.2 parts by mass fraction, and the modified graphite particles is 0.1 parts by mass fraction.

The above-mentioned composite oil displacement system is used for oil displacement. The viscosity of the simulated oil is 6.2 mPa·s at 50° C., the degree of mineralization of the simulated formation water is 5,300 mg/L; the temperature is 50° C.; the basic parameters of the well core are 20 cm×2.5 cm (length×diameter), and the permeability is 0.65 μm; 0.5 PV strengthened polymer/modified graphite particle composite oil displacement system is injected; oil displacement result: the water-flooding recovery factor is 41.7 percent, the ultimate recovery factor of polymer flooding with the polymer oil displacement system strengthened by modified graphite particles is 56.5 percent, i.e., the oil recovery factor is improved by 14.8 percent.

Example 2

The modified graphite particles prepared in the example 1 are utilized.

In this example, a use of the polymeric binary oil displacement system strengthened by the modified graphite particles is further provided:

0.2 g anionic polymer is added into 99.6 g clean water at room temperature (20±5° C.) while the mixture is stirred, and then the mixture is further stirred for 60 min so that the anionic polymer is dissolved fully; next, 0.1 g surfactant is added, and the mixture is stirred for 10 min so that the surfactant is dissolved fully; finally, 0.1 g modified graphite particles are added, and the mixture is stirred for 10 min so that the modified graphite particles are dispersed fully; thus, a polymeric binary oil displacement system strengthened by the modified graphite particles is obtained, wherein the polymer in the composite oil displacement system is 0.2 parts by mass fraction, the surfactant is 0.1 parts by mass fraction, and the modified graphite particles is 0.1 parts by mass fraction.

The above-mentioned composite oil displacement system is used for oil displacement. The viscosity of the simulated oil is 6.2 mPa·s at 50° C., the degree of mineralization of the simulated formation water is 5,300 mg/L; the temperature is 50° C.; the basic parameters of the well core are 20 cm×2.5 cm (length×diameter), and the permeability is 0.68 μm; 0.5 PV polymeric binary oil displacement system strengthened by the modified graphite particles is injected; oil displacement result: the water-flooding recovery factor is 42.4 percent, the ultimate recovery factor of polymer flooding with the polymeric binary oil displacement system strengthened by the modified graphite particles is 61.9 percent, i.e., the oil recovery factor is improved by 19.5 percent.

Example 3

The modified graphite particles prepared in the example 1 are utilized.

In this example, a use of the polymeric ternary composite oil displacement system strengthened by the modified graphite particles is further provided:

0.2 g anionic polymer is added into 99.2 g clean water at room temperature (20±5° C.) while the mixture is stirred, and then the mixture is further stirred for 60 min so that the anionic polymer is dissolved fully; next, 0.1 g surfactant is added, and the mixture is stirred for 10 min so that the surfactant is dissolved fully; next, 0.4 g sodium bicarbonate is added, and the mixture is stirred for 10 min so that the sodium bicarbonate is dissolved fully; finally, 0.1 g modified graphite particles are added, and the mixture is stirred for 10 min so that the modified graphite particles are dispersed fully; thus, a polymeric ternary composite oil displacement system strengthened by the modified graphite particles is obtained, wherein the polymer in the composite oil displacement system is 0.2 parts by mass fraction, the surfactant is 0.1 parts by mass fraction, the sodium bicarbonate is 0.4 parts by mass fraction, and the modified graphite particles is 0.1 parts by mass fraction.

Example 4

A modified graphite particle system for strengthening a polymer/binary/ternary composite oil displacement system, comprising: dispersed graphite particles in 2.0 parts by mass fraction; dispersant in 0.4 parts by fraction mass fraction; wettability modifier in 0.3 parts by mass fraction; and deionized water that amounts for the remaining content (97.3 parts by mass fraction); the sum of the components is 100 parts by mass fraction.

3 g dispersed graphite particles in 15 μm initial particle size is added into 97 g deionized water at room temperature (20±5° C.), and the mixture is stirred for 10 min so that the graphite particles are dispersed fully; the dispersed graphite particles are loaded into an ultrasonic device and dispersed by ultrasonic dispersion for 2 h, and then are held in a still state for 2 h; next, the supernatant liquid is taken; thus, 80 g dispersed graphite particle solution at 2 percent concentration is obtained; 0.32 g dispersant is added into the 80 g dispersed graphite particle solution, and is dispersed by ultrasonic dispersion for 2 h; 0.24 g wettability modifier is added into the dispersed solution obtained in the above-mentioned steps, and the mixture is stirred at 40° C. for 3 h; thus, a modified graphite particle system for strengthening a polymer/binary/ternary composite oil displacement system in 500 nm particle size is obtained.

In this example, a use of the polymer oil displacement system strengthened by the modified graphite particles is further provided:

0.15 g anionic polymer is added into 99.77 g clean water at room temperature (20±5° C.) while the mixture is stirred, and then the mixture is further stirred for 60 min so that the anionic polymer is dissolved fully; next, 0.08 g modified graphite particles are added, and the mixture is stirred for 10 min so that the modified graphite particles are dispersed fully; thus, a polymer oil displacement system strengthened by modified graphite particles is obtained, wherein the polymer in the composite oil displacement system is 0.15 parts by mass fraction, and the modified graphite particles is 0.08 parts by mass fraction.

The above-mentioned composite oil displacement system is used for oil displacement. The viscosity of the simulated oil is 6.2 mPa·s at 50° C., the degree of mineralization of the simulated formation water is 5,300 mg/L; the temperature is 50° C.; the basic parameters of the well core are 20 cm×2.5 cm (length×diameter), and the permeability is 0.95 μm; 0.5 PV polymer oil displacement system strengthened by the modified graphite particles is injected; oil displacement result: the water-flooding recovery factor is 44.52 percent, the ultimate recovery factor of polymer flooding with the polymer oil displacement system strengthened by modified graphite particles is 61.38 percent, i.e., the oil recovery factor is improved by 16.86 percent.

Example 5

The modified graphite particles prepared in the example 4 are utilized.

In this example, a use of the polymeric binary composite oil displacement system strengthened by the modified graphite particles is further provided:

0.15 g anionic polymer is added into 99.62 g clean water at room temperature (20±5° C.) while the mixture is stirred, and then the mixture is further stirred for 60 min so that the anionic polymer is dissolved fully; next, 0.15 g surfactant is added, and the mixture is stirred for 10 min so that the surfactant is dissolved fully; finally, 0.08 g modified graphite particles are added, and the mixture is stirred for 10 min so that the modified graphite particles are dispersed fully; thus, a polymeric binary composite oil displacement system strengthened by the modified graphite particles is obtained, wherein the polymer in the composite oil displacement system is 0.15 parts by mass fraction, the surfactant is 0.15 parts by mass fraction, and the modified graphite particles is 0.08 parts by mass fraction.

The above-mentioned composite oil displacement system is used for oil displacement. The viscosity of the simulated oil is 6.2 mPa·s at 50° C., the degree of mineralization of the simulated formation water is 5,300 mg/L; the temperature is 50° C.; the basic parameters of the well core are 20 cm×2.5 cm (length×diameter), and the permeability is 1.15 μm; 0.5 PV polymeric ternary composite oil displacement system strengthened by the modified graphite particles is injected; oil displacement result: the water-flooding recovery factor is 43.72 percent, the ultimate recovery factor of polymer flooding with the polymeric binary composite oil displacement system strengthened by the modified graphite particles is 66.58 percent, i.e., the oil recovery factor is improved by 22.86 percent.

Example 6

The modified graphite particles prepared in the example 4 are utilized.

In this example, a use of the polymeric ternary composite oil displacement system strengthened by the modified graphite particles is further provided:

0.2 g anionic polymer is added into 99.2 g clean water at room temperature (20±5° C.) while the mixture is stirred, and then the mixture is further stirred for 60 min so that the anionic polymer is dissolved fully; next, 0.1 g surfactant is added, and the mixture is stirred for 10 min so that the surfactant is dissolved fully; next, 0.4 g sodium bicarbonate is added, and the mixture is stirred for 10 min so that the sodium bicarbonate is dissolved fully; finally, 0.1 g modified graphite particles are added, and the mixture is stirred for 10 min so that the modified graphite particles are dispersed fully; thus, a polymeric ternary composite oil displacement system strengthened by the modified graphite particles is obtained, wherein the polymer in the composite oil displacement system is 0.15 parts by mass fraction, the surfactant is 0.15 parts by mass fraction, the sodium bicarbonate is 0.4 parts by mass fraction, and the modified graphite particles is 0.08 parts by mass fraction.

The above-mentioned composite oil displacement system is used for oil displacement. The viscosity of the simulated oil is 6.2 mPa·s at 50° C., the degree of mineralization of the simulated formation water is 5,300 mg/L; the temperature is 50° C.; the basic parameters of the well core are 20 cm×2.5 cm (length×diameter), and the permeability is 1.08 μm; 0.5 PV polymeric ternary composite oil displacement system strengthened by the modified graphite particles is injected; oil displacement result: the water-flooding recovery factor is 45.67 percent, the ultimate recovery factor of polymer flooding with the polymeric ternary composite oil displacement system strengthened by the modified graphite particles is 72.49 percent, i.e., the oil recovery factor is improved by 26.82 percent.

Example 7

A modified graphite particle system for strengthening a polymer/binary/ternary composite oil displacement system, comprising: dispersed graphite particles in 2.0 parts by mass fraction; dispersant in 0.3 parts by mass fraction; wettability modifier in 0.2 parts by mass fraction; and deionized water that amounts for the remaining content (97.5 parts by mass fraction); the sum of the components is 100 parts by mass fraction.

3 g dispersed graphite particles in 100 µm initial particle size is added into 97 g deionized water at room temperature (20±5° C.), and the mixture is stirred for 10 min so that the graphite particles are dispersed fully; the dispersed graphite particles are loaded into an ultrasonic device and dispersed by ultrasonic dispersion for 1 h, and then are held in a still state for 2 h; next, the supernatant liquid is taken; thus, 80 g dispersed graphite particle solution at 2 percent concentration is obtained; 0.24 g dispersant is added into the 80 g dispersed graphite particle solution, and is dispersed by ultrasonic dispersion for 1 h; 0.16 g wettability modifier is added into the dispersed solution obtained in the above-mentioned steps, and the mixture is stirred at 40° C. for 2 h; thus, a modified graphite particle system for strengthening a polymer/binary/ternary composite oil displacement system in 60 µm particle size is obtained.

In this example, a use of the polymer oil displacement system strengthened by the modified graphite particles is further provided:

0.2 g anionic polymer is added into 99.74 g clean water at room temperature (20±5° C.) while the mixture is stirred, and then the mixture is further stirred for 60 min so that the anionic polymer is dissolved fully; next, 0.06 g modified graphite particles are added, and the mixture is stirred for 10 min so that the modified graphite particles are dispersed fully; thus, a polymer oil displacement system strengthened by modified graphite particles is obtained, wherein the polymer in the composite oil displacement system is 0.2 parts by mass fraction, and the modified graphite particles is 0.06 parts by mass fraction.

The above-mentioned composite oil displacement system is used for oil displacement. The viscosity of the simulated oil is 6.2 mPa·s at 50° C., the degree of mineralization of the simulated formation water is 5,300 mg/L; the temperature is 50° C.; the basic parameters of the well core are 20 cm×2.5 cm (length×diameter), and the permeability is 2.36 µm; 0.5 PV strengthened polymer/modified graphite particle composite oil displacement system is injected; oil displacement result: the water-flooding recovery factor is 43.17 percent, the ultimate recovery factor of polymer flooding with the polymer oil displacement system strengthened by modified graphite particles is 59.75 percent, i.e., the oil recovery factor is improved by 14.62 percent.

Example 8

The modified graphite particles prepared in the example 7 are utilized.

In this example, a use of the polymeric binary composite oil displacement system strengthened by the modified graphite particles is further provided:

0.2 g anionic polymer is added into 99.59 g clean water at room temperature (20±5° C.) while the mixture is stirred, and then the mixture is further stirred for 60 min so that the anionic polymer is dissolved fully; next, 0.15 g surfactant is added, and the mixture is stirred for 10 min so that the surfactant is dissolved fully; finally, 0.06 g modified graphite particles are added, and the mixture is stirred for 10 min so that the modified graphite particles are dispersed fully; thus, a strengthened polymer/modified graphite particle composite oil displacement system is obtained, wherein the polymer in the composite oil displacement system is 0.2 parts by mass fraction, the surfactant is 0.15 parts by mass fraction, and the modified graphite particles is 0.06 parts by mass fraction.

The above-mentioned composite oil displacement system is used for oil displacement. The viscosity of the simulated oil is 6.2 mPa·s at 50° C., the degree of mineralization of the simulated formation water is 5,300 mg/L; the temperature is 50° C.; the basic parameters of the well core are 20 cm×2.5 cm (length×diameter), and the permeability is 2.46 µm; 0.5 PV polymeric binary composite oil displacement system strengthened by the modified graphite particles is injected; oil displacement result: the water-flooding recovery factor is 46.59 percent, the ultimate recovery factor of polymer flooding with the polymeric binary composite oil displacement system strengthened by the modified graphite particles is 68.47 percent, i.e., the oil recovery factor is improved by 21.88 percent.

Example 9

The modified graphite particles prepared in the example 7 are utilized.

In this example, a use of the polymeric ternary composite oil displacement system strengthened by the modified graphite particles is further provided:

0.2 g anionic polymer is added into 99.09 g clean water at room temperature (20±5° C.) while the mixture is stirred, and then the mixture is further stirred for 60 min so that the anionic polymer is dissolved fully; next, 0.15 g surfactant is added, and the mixture is stirred for 10 min so that the surfactant is dissolved fully; next, 0.5 g sodium bicarbonate is added, and the mixture is stirred for 10 min so that the sodium bicarbonate is dissolved fully; finally, 0.06 g modified graphite particles are added, and the mixture is stirred for 10 min so that the modified graphite particles are dispersed fully; thus, a polymeric ternary composite oil displacement system strengthened by the modified graphite particles is obtained, wherein the polymer in the composite oil displacement system is 0.2 parts by mass fraction, the surfactant is 0.15 parts by mass fraction, the sodium bicarbonate is 0.5 parts by mass fraction, and the modified graphite particles is 0.06 parts by mass fraction.

The above-mentioned composite oil displacement system is used for oil displacement. The viscosity of the simulated oil is 6.2 mPa·s at 50° C., the degree of mineralization of the simulated formation water is 5,300 mg/L; the temperature is 50° C.; the basic parameters of the well core are 20 cm×2.5 cm (length×diameter), and the permeability is 2.29 µm; 0.5 PV polymeric ternary composite oil displacement system strengthened by the modified graphite particles is injected; oil displacement result: the water-flooding recovery factor is 44.51 percent, the ultimate recovery factor of polymer flooding with the polymeric ternary composite oil displacement system strengthened by the modified graphite particles is 69.84 percent, i.e., the oil recovery factor is improved by 25.33 percent.

While the present invention is described above in examples, the description is exemplary rather than exhaustive, and the present invention is not limited to the examples disclosed above. It is obvious to those having ordinary skills in the art that various modifications and alternations can be made without departing from the scope and spirit of the examples described above. Therefore, the protection scope of the present invention shall be deemed as the protection scope defined by the claims only.

What is claimed is:

1. A modified graphite particle system for strengthening a polymer/binary/ternary composite oil displacement system, the modified graphite particle system comprising: 1-5 parts by mass fraction dispersed graphite particles, 0.2-0.6 parts by mass fraction dispersant, 0.1-0.5 parts by mass fraction wettability modifier, and deionized water that amounts for the remaining content, based on 100 parts by total mass fraction of the components; the initial particle size of the dispersed graphite particles is 10-150 μm; the dispersant is a polyvinyl pyrrolidone, with 8,000-32,000 relative molecular weight; and the wettability modifier is an alkylphenyl ethoxylate non-ionic surfactant in a structure represented by the following formula (1):

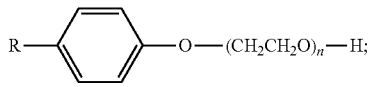

formula (1)

in the formula (1), R is $C_8$ alkyl; n is 9 or 10.

2. A method of preparing the modified graphite particle system for strengthening a polymer/binary/ternary composite oil displacement, the method comprising:
   Step 1: adding graphite particles to be dispersed into deionized water and stirring to disperse the graphite particles at room temperature;
   Step 2: loading the dispersed graphite particles in an ultrasonic device, dispersing by ultrasonic dispersion, holding in a still state, and then taking the supernatant liquid;
   Step 3: adding the dispersant into the supernatant liquid of dispersed graphite particles, and dispersing by ultrasonic dispersion; and
   Step 4: adding the wettability modifier and stirring at a temperature higher than room temperature, so as to prepare the modified graphite particle system for strengthening the polymer/binary/ternary composite oil displacement system of claim 1.

3. The method according to claim 2, wherein the stirring time for dispersion in the step 1 is 10 min;
   the ultrasonic dispersion time in the step 2 is 1-5 h, and the holding time is 1-4 h;
   the ultrasonic dispersion time in the step 3 is 1-3 h; and
   the wettability modifier added in the step 4 is the alkylphenyl ethoxylate non-ionic surfactant according to claim 1, the stirring temperature is 40-50° C., and the stirring time is 1-6 h.

4. A method of strengthening a polymer/binary/ternary composite oil displacement system, the method comprising:
   Step 1: adding a polymer into solution preparation water, and stirring for 60-80 min, so that the polymer is dissolved fully;
   Step 2: adding a surfactant or alkali or adding the surfactant and the alkali in combination, and stirring for 5-10 min, so that the surfactant and/or alkali are/is dissolved fully; and
   Step 3: adding the modified graphite particle system of claim 1, and stirring for 5-10 min, so that the modified graphite particle system is dispersed fully.

5. The method according to claim 4, wherein in the step 1, the solution preparation water is clean water or treated return water in an oil field;
   the polymer is an anionic polymer with 14-18 million relative molecular weight, at 20-30 parts by hydrolysis degree, in 0.1-0.25 parts by mass fraction;
   the alkali used in the step 2 is selected from one of sodium carbonate, sodium bicarbonate and sodium hydroxide or a combination of any two of them, in 0.4-0.6 parts by total mass fraction; and
   the modified graphite particle system in the step 3 is a modified graphite particle system prepared with a method comprising the following steps:
   Step 1: adding graphite particles to be dispersed into deionized water and stirring to disperse the graphite particles at room temperature;
   Step 2: loading the dispersed graphite particles in an ultrasonic device, dispersing by ultrasonic dispersion, holding in a still state, and then taking the supernatant liquid;
   Step 3: adding the dispersant into the supernatant liquid of dispersed graphite particles, and dispersing by ultrasonic dispersion; and
   Step 4: adding the wettability modifier and stirring at a temperature higher than room temperature, so as to prepare the modified graphite particle system for strengthening the polymer/binary/ternary composite oil displacement system, wherein
   the modified graphite particle system has a 150 nm-100 μm size distribution and 0.05-0.1 parts by mass fraction.

* * * * *